United States Patent [19]

Szymberski

[11] Patent Number: 5,419,030
[45] Date of Patent: May 30, 1995

[54] METHOD FOR MOUNTING A PROTECTIVE SLEEVE ONTO A HOSE

[76] Inventor: Gary A. Szymberski, 15706 Sigwalt Dr., Clinton Township, Macomb County, Mich. 48038

[21] Appl. No.: 80,367
[22] Filed: Jun. 21, 1993
[51] Int. Cl.⁶ .................. B23P 11/02; B23P 19/02
[52] U.S. Cl. ............................. 29/450; 29/235
[58] Field of Search ............ 29/450, 234, 235, 241; 254/134, 3 FT, 134.4

[56] References Cited

U.S. PATENT DOCUMENTS

| 2,272,704 | 2/1942 | Harding | 29/235 |
| 2,347,003 | 4/1944 | Searle | 29/235 |
| 2,572,215 | 10/1951 | Swart | 29/450 |
| 3,119,174 | 1/1964 | Wokeck | 29/450 |
| 3,675,315 | 7/1972 | Zebe | 29/241 |
| 4,506,430 | 3/1985 | Guzay, Jr. | 29/235 |

FOREIGN PATENT DOCUMENTS 433605 8/1935 United Kingdom .................. 29/450

Primary Examiner—P. W. Echols
Attorney, Agent, or Firm—Peter D. Keefe

[57] ABSTRACT

A tool to facilitate placement of a flaccidly flexible protective sleeve onto a hose includes a hollow tube to receive the protective sleeve thereon, and a conical end portion removably attached to the tube for facilitating sliding placement of the protective sleeve onto the tube. In use, a protective sleeve is slid over the conical end portion and onto the tube, the end portion is removed from the tube, and a hose is passed through the hollow center of the tube. The protective sleeve is then slid off the end of the tube onto the hose simultaneously as the hose is pulled through the tube to thereby transfer the protective sleeve onto the hose.

3 Claims, 1 Drawing Sheet 5,419,030

METHOD FOR MOUNTING A PROTECTIVE SLEEVE ONTO A HOSE

BACKGROUND OF THE INVENTION

1. Field of the Invention

The present invention relates to hoses and protective sleeves which fit thereover. More particularly, the present invention relates to a tool and method of use therefor for mounting a protective sleeve onto a hose.

2. Description of the Relevant Art

Protective sleeves for covering hoses, such as central vacuum hoses or the like, are known and are commercially available. These protective sleeves for hoses are advantageous because they protect household items, such as furniture, from being scratched or marred by the hose. For example, protective sleeves for central vacuum hoses are available from Vacsoc Inc. of Concord, Ontario, and from Cen-Tec Systems of Bloomington, Ill. The commercially available protective sleeves are flaccidly flexible and normally include an elastic fabric or fabric-like material as part of their construction so that they will conform snugly to the external contours of the central vacuum hose, which is itself flexible and normally ribbed.

However, the job of mounting such a protective sleeve onto a central vacuum hose is a difficult and time-consuming effort, since the protective sleeve tends to grip the hose at any particular point when placed thereon, particularly due to the ribbing, and since the protective sleeve must generally pass over an enlarged fitting at one end before it reaches the hose itself. A need therefore exists in the art for an improved method of mounting a protective sleeve onto a hose, and for a tool which will facilitate mounting a protective sleeve onto such a hose.

SUMMARY OF THE INVENTION

The present invention provides a tool for facilitating the placement of a protective sleeve onto a hose. The tool in accordance with the present invention is generally composed of a substantially cylindrical tube having a hollow passageway formed therethrough, and a substantially conical end portion removably attached to an end of the tube in coaxial alignment therewith.

The present invention also provides an improved method of mounting a protective sleeve onto a hose. The method in accordance with the present invention generally includes the steps of: providing a tool to assist a user in mounting the protective sleeve onto the hose, the tool being essentially constituted as described immediately hereinabove, placing an open end of a flaccidly flexible protective sleeve onto the end portion of the tool, sliding a first part of the protective sleeve over the end portion and onto the tube, progressively sliding the rest of the sleeve over the conical end portion and onto the tube until at least substantially the entire protective sleeve is situated on the tube, removing the conical end portion from the tube, passing a first end of a hose through the tube from one end thereof and out the other end thereof until the second end of the hose is adjacent the one end of the tube, sliding the first part of the protective sleeve off the tube and onto the hose, moving the second end of the hose axially away from the one end of the tube while simultaneously feeding the rest of the protective sleeve onto the hose at a rate equal to the movement of the hose, and separating the tube from the hose whereupon the protective sleeve is situated on the hose.

Accordingly, it is an object of the present invention to provide a tool for slidably mounting a protective sleeve onto a hose.

It is another object of the present invention to provide a tool for slidably mounting a protective sleeve onto a hose, wherein the ends of the hose have fittings connected thereto which have cross-sections exceeding that of the hose itself.

It is a further object of the present invention to provide a method for placing a protective sleeve onto a hose.

It is an additional object of the present invention to provide a method for placing a protective sleeve onto a hose, wherein the ends of the hose have fittings connected thereto which exceed the diameter of the hose itself.

Figure 2:
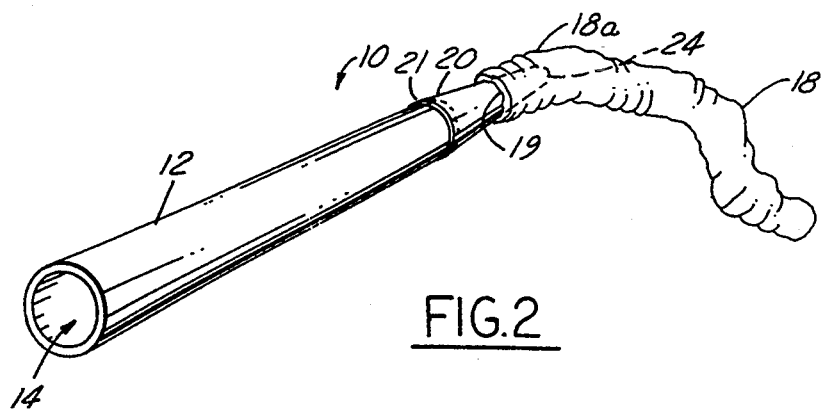
FIG. 2 is a perspective view of a protective sleeve for a hose being mounted on the embodiment of FIG. 1.

For a more complete understanding of the present invention, the reader is referred to the following detailed description, which should be read in conjunction with the accompanying drawings. Throughout the following description and in the drawings, like numbers refer to like parts throughout the several views.

DETAILED DESCRIPTION OF THE PREFERRED EMBODIMENT

Figure 1:
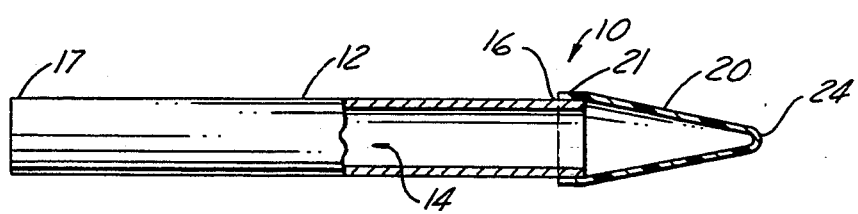
FIG. 1 is a top elevational view, partially in cross-section, of a preferred embodiment of the tool in accordance with the present invention, the depicted embodiment including a tube and an end portion.
Figure 3:
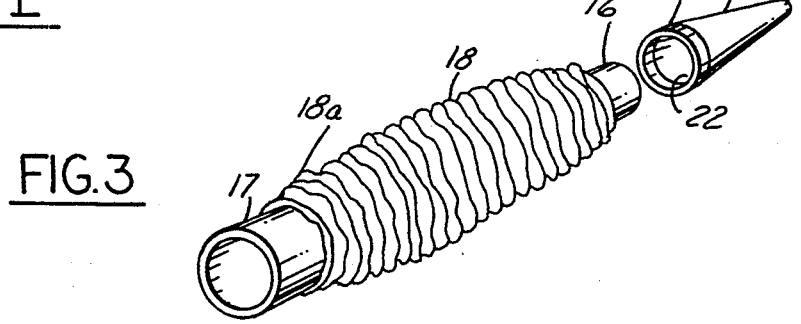
FIG. 3 is a perspective view similar to FIG. 2, with the protective sleeve installed on the tube thereof and the end portion removed from the tube.

Referring now to the drawings, and particularly to FIG. 1, a tool 10 in accordance with a preferred embodiment of the present invention is shown which includes a tube 12 of preferably cylindrical cross-section, having a hollow passageway 14 formed therethrough. The tube 12 is preferably formed from a smooth, durable material such as plastic or metal. It is preferred that the exterior surface of the tube 12 be smooth, continuous, and uninterrupted in order to present a suitable surface for sliding a fabric or fabric-like protective sleeve thereupon. The tube 12 is preferably three to five feet in length and the passageway 14 is preferred to be at least three inches in diameter in order to allow a hose 30 to pass therethrough, as well as an optional fitting which may or may not be connected to one end of the hose. As noted, the preferred shape for the tube 12 is cylindrical, although it could be made with a geometric cross-section such as for example an hexagonal or octagonal shape and still be equivalent.

The tool 10 also includes a generally conically shaped end portion 20 having a connection end 21 which is dimensioned to mate with at least one end of the tube. In this regard, the connection end 21 is shown removably attached to a first end 16 of the tube 12. The attachment between the connection end 21 of the end portion 20 and the first end 16 of the tube 12 may be by interference fit, by means of interconnecting screw threads formed on respectively contacting portions of the tube and end portion, or by other appropriate means, so long as the end portion 20 is easily removable by a user of the tool 10. In the embodiment shown in the drawings, the end portion 20 is provided with a connector end 21 having a hollow interior opening 22 in which the inside diameter thereof is just slightly larger than the outside diameter of the first end 16 of the tube 12 so as to allow the first end to fit slidably therein and thereby provide the aforementioned slidable interference fit therebetween. This structural arrangement ensures that a protective sleeve 18 may be slid over the end portion 20 and onto the tube 12 without getting pinched between the tube 12 and the end portion 20. It is preferred, in the practice of the present invention, that the end portion 20 be conically shaped with a rounded tip 24 in order to present a surface which will not pose any safety hazard to pets or small children, and which will resist piercing of the material of the protective sleeve 18 when placed slidably thereupon. It is also preferred that the exterior surface of the end portion 20 be smooth, continuous, and uninterrupted in order to present a suitable surface for sliding a fabric or fabric-like protective sleeve 18 thereover, as is further described hereinbelow. The length of the end portion 20 is not critical, but a suitable length could be in the range of approximately six to eight inches.

The tube 12 together with the end portion 20 make up the preferred embodiment of the tool 10 hereof. Those skilled in the art to which the present invention pertains will realize that the tool 10 hereof could easily be modified or additional features could be added thereto without changing the essential character or function thereof. It is also contemplated that the tool 10 hereof could be sold in a package with a protective sleeve 18 to form a complete set.

The present invention also encompasses an improved method of installing a protective sleeve 18 onto a hose 30 using the tool 10 hereof, and the reader will gain a better understanding of the use of the tool 10 hereof after reading the following description of the method in accordance with the present invention. The following description is directed primarily to placing a protective sleeve 18 on a hose 30 in the form of a flexible, ribbed central vacuum hose such as might be used in cleaning a home or the like. However, the tool and method according to the present invention are appropriate for use in any application of placing a protective sleeve onto a hose.

Figure 4:
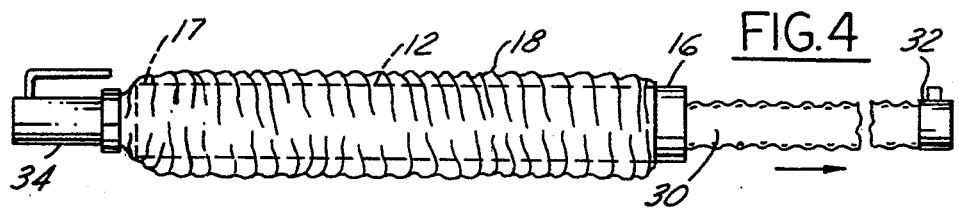
FIGS. 4 and 5 are side views of the tube and protective sleeve of FIG. 3, with a hose inserted through the tube and the protective sleeve being placed thereon, wherein the hose is shown partially cut away.
Figure 5:
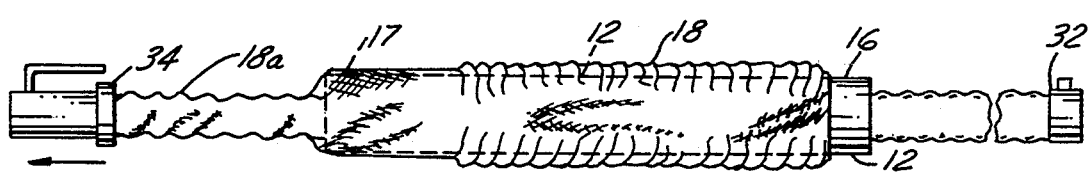
Figure 6:
FIG. 6 is a side view of the hose of FIGS. 4 and 5, with the protective sleeve mounted thereon.

In practicing the method in accordance with the present invention, a hollow and flaccidly flexible protective sleeve 18, preferably constructed of an elastic fabric material although this is not a requirement, is applied to the exterior surface of a hose 30 using the tool 10. Initially, the connection end 21 of the end portion 20 is attached to the first end 16 of the tube 12. A first open end 19 of the protective sleeve 18 is slidably placed onto the end portion 20 from the tip 24 toward the connection end 21 thereof. A first part 18a of the protective sleeve 18, adjacent to the open end 19 thereof, is slid over the conical end portion 20 and onto the tube 12. Subsequently, the rest of the protective sleeve 18 is progressively slid over the conical end portion 20 and onto the tube 12, in turn, until at least substantially the entire protective sleeve 18 is situated on and surrounding the tube 12. The first part 18a should be now located adjacent the second end 17 of the tube 12. Once the protective sleeve 18 has been placed on the tube 12, the end portion 20 is removed therefrom and the hose 30 is passed through the tube 12 starting from either the first end 16 or the second end 17 thereof, the second end being depicted for this purpose in FIG. 4. When using the tool 10 to mount a protective sleeve 18 onto the hose 30 which is in the form of a central vacuum hose, the first end 32 of the central vacuum hose is defined by a connector fitting which is firstly fed through the tube 12. This is done because the other end 34 of the vacuum hose is defined by a handle fitting that has a much larger cross-section than the connector fitting, which makes it impossible to be passed through the passageway 14 of the tube 12, since the tube diameter is too small due to the limited accommodative elasticity of the protective sleeve 18 which prevents it being placed onto a tube of so large a cross-section.

The hose 30 is passed through the tube until the second end 34 of the hose 12 is adjacent the second end 17 of the tube 12. The hose 30 is then pulled back out of the tube 12 (the second end 34 being pulled axially away from the second end 17 of the tube) while the first part 18a of the protective sleeve 18 is slid off the tube 12 and placed feedably onto the hose 30 starting from adjacent the second end 34 thereof at a rate that matches movement of the hose with respect to the tube 12. The hose 30 is pulled through the passageway 14 of the tube 12 while the protective sleeve 18 is transferred from the exterior surface of the tube 12 and onto the hose 30. After the entire length of the protective sleeve 18 has been placed surroundingly onto the hose 30 along the full length thereof between the first and second ends 32, 34, the tube 12 is separated from the hose 30 whereupon the protective sleeve 18 is surroundingly located onto the hose.

While the above description details passing the hose through the tube 12 from the second end thereof, the hose can, of course, be passed through the tube starting from either of the first or the second ends thereof.

The above described method of mounting a protective sleeve 18 onto a hose 30 is significantly superior to the previously known method because it is much faster and easier than the cumbersome task of continuously stretching parts of the elastic protective sleeve 18 over the connector fitting at the first end 32 of the hose 30. A business using the method and tool according to the present invention would realize a significant savings in labor cost if this task were to be performed repetitively on the job. The above described process would be essentially reversed if a user wished to use the tool hereof to remove the protective sleeve 18 from the hose 30.

Although the present invention has been described herein with reference to a preferred embodiment thereof, it will be understood that the foregoing description is intended to be illustrative rather than restrictive, and that the invention is not limited to the specific embodiment described herein. Many modifications will occur to those skilled in the art to which the invention pertains. For instance, the end portion may be composed of a series of conical shape defining wires, rather than an actual continuous conical surface, and/or the tube may be composed of a series of tube shape defining wires, each oriented parallel to the tube axis, rather than an actual continuous tube surface. All such modifications which fall within the scope of the appended claims are intended to be within the scope and spirit of the present invention.

What is claimed is:

1. A method of mounting a flaccidly flexible protective sleeve having a first end and a second end onto a hose, said method comprising the steps of:
　placing the protective sleeve onto a tube having a hollow passageway between a first end and a second end thereof;
　inserting the first end of the hose through the hollow passageway of the tube and thereupon passing the hose through the hollow passageway until a preselected location of the hose is adjacent the second end of the tube;
　sliding a first part of the protective sleeve off of the tube and onto the preselected location of the hose;
　pulling the second end of the hose axially away from the second end of the tube while simultaneously progressively transferring the rest of the protective sleeve from the tube onto the hose until all the protective sleeve is transferred onto the hose; and
　removing the hose from the tube.

2. The method of claim 1, wherein said step of placing comprises the steps of:
　attaching a substantially conically shaped end portion to one of the first and second ends of the tube, a tip of the end portion being axially aligned with the tube and facing away from the tube;
　placing an open end of the first part of the protective sleeve onto the conical end starting from the tip thereof;
　sliding a first part of the protective sleeve over the end portion and onto the tube;
　progressively sliding the rest of the protective sleeve over the end portion and onto the tube until at least substantially the entire protective sleeve is situated on the tube; and
　removing the conical end portion from the tube.

3. The method of claim 2, wherein said step of inserting comprises the preselected location being the second end of the hose.

* * * * *